Patented May 2, 1939

2,156,378

UNITED STATES PATENT OFFICE 2,156,378

METHOD OF NEUTRALIZING THE CONDITION PRODUCING QUALITIES OF FINELY PULVERIZED SILICIOUS MATERIALS

James J. Denny and Wilmot D. Robson, Schumacher, Ontario, Canada

No Drawing. Application January 18, 1939, Serial No. 251,532

12 Claims. (Cl. 52—1)

This application is a continuation-in-part of our earlier patent application Serial No. 145,296, filed May 28, 1937.

Numerous industries operating with materials of a silicious nature are very seriously handicapped by the fact that its operatives are affected by the inhalation of fine particles of the silicious materials which ultimately result in conditions very dangerous to health which are known to be responsible for a very high percentage of incapacitation of the operatives and also a high death rate which the services of many gifted research scientists have failed to abate.

The object of the present invention is to provide a condition for persons operating in atmospheres laden with dust containing silicious materials which will obviate the detrimental or chemical effect resultant upon the inhalation of fine particles of such materials and thereby prevent the development of pneumoconiosis in those exposed to the breathing of such dust laden air.

Exhaustive experiments have proven that when fine particles of silicious materials are brought into contact with alkaline fluids a chemical change in the silica particles takes place. The fluid in the lungs of humans being alkaline with a pH of approximately 7.37, the inhalation of such silicious particles results in a chemical change in the lung cells which produces a toxic condition causing the death of tissue cells and the production of fibrous tissue resulting in fibrosis of the lung structure. When silicious particles are inhaled pneumoconiosis is induced and the action is considerably accelerated in underground work due to noxious gases which are the product of combustion of blasting powders.

The present invention proposes the intimate admixture with a silicious dust, of fine particles of metallic aluminum or its compounds, of substantially the same size and/or specific gravity as the silicious dust and capable of being breathed into the lungs, in proportions sufficient to neutralize the chemical reaction of the soluble portion of the silicious material.

Beaker tests made after extensive experimentation have shown that 1 gramme of quartz dust reduced to a size not exceeding 5 microns, immersed in 100 c. c.'s of distilled water results in dissolving approximately 50 parts per million of the silica at blood temperature. The addition of 10 milligrams of metallic aluminum dust to 1 gramme of quartz dust in 100 c. c.'s of distilled water results in the reduction of the dissolution of the soluble silica to a negligible quantity.

Careful experimental tests have shown that where the silicious material contains alkaline earths, potassium and/or sodium compounds the silica passes into solution more rapidly and in greater quantity than when these are not present, but whether the dust is practically pure silica or a compound with such materials as above noted, the presence of metallic aluminum or its compounds in even the small proportion of approximately 1% reduces the chemical reaction resulting in the formation of toxic acids, to a negligible quantity.

Experiments as to solubility of various silicious materials have shown that by the addition of 1% or less of metallic aluminum to eight different kinds of silicious materials placed in a solution with a pH of approximately 7.0 the solubility of the silicious material was reduced approximately 91%.

Further solubility tests were made with various samples of silica rock finely pulverized and simultaneously subjected to continuous agitation in rubber stoppered "Bakelite" tubes for a period of twenty hours at a temperature maintained in a water bath from 37°–40° C.

Results

| Sample | Gramme | $H_2O$ Alum | P. p. m. silica | Reduction |
|---|---|---|---|---|
| McIntyre mine quartz | 1.0 | 100 c. c. | 33.2 | Percent |
| Do | 1.0 | 100 c. c.+10 mg. | 1.1 | 96 |
| Montreal silica | 1.0 | 100 c. c. | 4.4 | |
| Do | 1.0 | 100 c. c.+10 mg. | 1.2 | 72 |
| Do | 1.0 | 100 c. c.+ 5 mg. $CaCO_3$ | 11.8 | |
| Do | 1.0 | 100 c. c.+10 mg.+5 mg. $CaCO_3$ | 2.1 | 82 |
| Left hand quartz crystal | 1.0 | 100 c. c. | 34.9 | 90 |
| Do | 1.0 | 100 c. c.+10 mg. | 3.4 | |

The effect of aluminum dust on quartz solubilities in synthetic physiological solutions is shown in the following tests made in rubber stoppered "Bakelite" tubes under continuous agitation at 37.5° C. (blood heat).

(1) 100 C. C. Tyrode's solution +1.0 grammes McIntyre quartz.

(2) 100 C. C. Tyrode's solution +10 mg. al. dust +1.0 grammes McIntyre quartz.

| Days | (1) SiO$_2$ p. p. m. | (2) | Reduction |
|---|---|---|---|
| | | | Percent |
| 9 | 41.9 | 2.2 | 95 |
| 27 | 35.9 | 2.8 | 92 |

The results of these experiments prove conclusively that the presence of metallic aluminum dust in very small proportional quantities results in an enormous reduction in the solubility of silicious compounds and it may be reasonably adduced that the dispersal of finely pulverized aluminum or aluminous compounds into the atmosphere of mines, soap factories, ceramic industries and where stone workers, glass grinders, sand blasters, etc. are operating, will have a beneficial effect in materially reducing if not completely eliminating the danger of the workers contracting pneumoconiosis.

It is believed that when the aluminum or aluminum compound enters the lungs and is acted upon by the lung fluid, it is changed to an oxide or an hydroxide and, in comparison, the metallic aluminum has an advantage over compounds thereof due to its more prolonged hydroxide-producing properties in the lung environment.

It will be appreciated that many different methods of dispersing the aluminum dust so that it may be brought into association with the silicious materials in the lung fluid may be devised. In mines it may be incorporated in the blasting charges, or in mines or other industries it may be carried into the dust-laden air by air circulating means, the latter being probably the most effective method in most industrial plants.

When incorporated in a blasting charge the aluminous material may be placed in a small package in a convenient form separate from the explosive charge so that it will be blown out and widely dispersed in the atmosphere with the dust.

It will also be understood that if in the course of manufacture the aluminum dust to be used is associated with such material as stearic acid or other coating, which might interfere with or objectionably retard the desired reaction with the body fluids when breathed into the pulmonary system, such foreign material should be removed in any suitable manner or avoided and such dust must be of a fineness capable of being breathed into the lungs, preferably less than 10 microns and preferably 5 microns or less.

Throughout the specification reference has been made to the use of "aluminum and/or its compounds" or to "aluminous compounds" and it must be understood that such reference includes besides powdered metallic aluminum, any suitable or non-toxic aluminum compound, salt or derivative, such for example as aluminum oxide and aluminum hydroxide, in organic aluminum salts such as Al ammonium sulphate, Al chloride liquid, Al potassium sulphate, Al sulphate and many others; also organic salts such as Al acetate basic, Al acetotartrate, Al acetate, Al citrate and many others which may include substituted hydroxy compounds or substituted hydrocarbons.

Where the term "aulminous material" is used in the claims it should be construed as including aluminum and/or suitable compounds, salts or derivatives thereof either separately or in any desired combination and in a form capable of entry into the human system as a means of counteracting or neutralizing the deleterious effect of breathing in fine particles of silicious material, within the spirit of the present invention.

It may be found desirable to apply the aluminum dust in other ways than those suggested, such for instance as by being breathed from some form of inhalator or perhaps where abrasives are used, the nozzle or tool for using the abrasive can be provided with an aluminum surface which will be abraded and disintegrated by the silica particles in the actual work being done by the operative.

The laboratory tests made in aqueous solutions have been supplemented by tests with synthetic physiological solutions and very extensive experiments and tests have been made with animals where such were subjected to the effects of inhaled quartz dust and quartz dust mixed with 1% aluminum dust and it has been shown that the addition of small quantities of aluminum dust to the quartz dust almost completely inhibits the development of fibrosis while animals subjected to quartz dust without aluminum showed well developed silicosis. These animals were subjected to treatment for sixteen hours daily for a period of six months.

Details of these tests may be found in the paper presented by the applicants before the Academy of Medicine at Toronto, Canada, June 15, 1937, and published in the Canadian Medical Association Journal 37, 1–11, 1937.

The ideal to be sought after is to procure aluminous material equivalent to a minimum of substantially 1% of the metallic aluminum in the lungs relative to the silicious material and a sufficient percentage should be maintained in the atmosphere to be inhaled to ensure such a condition. The aluminous material may optionally be inhaled independent of the silicious material to be subsequently admixed with this silicious material in lungs.

What we claim as our invention is:

1. The method of neutralizing the lung fibrosis-producing properties of finely pulverized silicious materials, comprising intimately associating therewith aluminous material capable of offsetting said properties in the respiratory organs.

2. A method of neutralizing the lung fibrosis-producing properties of finely pulverized silicious materials, comprising intimately associating therewith aluminous material of a fineness capable of being breathed into the lungs therewith and of a quality and quantity capable of substantially nullifying said properties in the lung environment.

3. A method of neutralizing the lung fibrosis-producing properties of finely pulverized silicious materials, comprising intimately associating therewith a suitable derivative of aluminum of a fineness capable of being breathed into the lungs along with the silicious particles.

4. A method of neutralizing the lung fibrosis-producing qualities of finely pulverized silicious materials consisting in associating with the silicious dust a quantity of finely pulverized aluminum in particles sufficiently small to be breathed into the lungs.

5. A method as claimed in claim 4 in which the finely powdered aluminum is of a size not exceeding 10 microns.

6. A method as claimed in claim 4 consisting in maintaining in a silica dust laden atmosphere approximately one percent (1%) of the weight of silicious particles per cc. of the finely pulverized aluminum.

7. A method as claimed in claim 4 consisting in first removing any detrimental coating material from the pulverized aluminum.

8. A method as claimed in claim 1 in which said aluminous material is dispersed in such quantity as to procure in the lungs an amount equivalent to a minimum of substantially 1% of metallic aluminum relative to the silicious material.

9. A method of neutralizing lung fibrosis-producing qualities of finely pulverized silicious materials, consisting in mixing with the silicious dust a quantity of finely atomized non-toxic aluminum compounds in particles sufficiently small to be breathed into the lungs.

10. A method of neutralizing the deleterious condition-producing properties of silicious dust in zones where operatives are engaged and which zones are provided with air circulating means, comprising distributing finely subdivided aluminous material to the atmosphere by way of the air circulating means.

11. A method as claimed in claim 4 in which the association of the aluminum with a silicious dust is accomplished by placing the pulverized aluminum with a blasting charge in a container separate from said blasting charge and dispersing same simultaneously with the creation of the silicious dust in the explosion of the blasting charge.

12. A method of neutralizing the lung fibrosis-producing properties of finely pulverized silicious material comprising dispersing aluminous material independent of the pulverized silicious particles in such proportion and of such fineness as to be breathed into the lungs for subsequent admixture with the silicious particles in the lungs.

JAMES J. DENNY.
WILMOT D. ROBSON.